United States Patent [19]

Petrov et al.

[11] Patent Number: 4,811,327
[45] Date of Patent: Mar. 7, 1989

[54] OPTICAL STORAGE DEVICE

[75] Inventors: Vyacheslav V. Petrov; Alexandr A. Antonov; Alexandr P. Tokar; Andrei A. Krjuchin; Vladimir P. Skuridin, all of Kiev; Nikolai V. Gorshkov, Moscow; Valery D. Kovtun; Leonid M. Gapchenko, both of Kiev; Anton V. Vozovik, Kamenets-Podolsky, all of U.S.S.R.

[73] Assignee: Institut Problem Modelirovania v energetiki AN Ukr. SSR, Kiev, U.S.S.R.

[21] Appl. No.: 134,782

[22] PCT Filed: Feb. 5, 1987

[86] PCT No.: PCT/SU87/00017
§ 371 Date: Oct. 6, 1987
§ 102(e) Date: Oct. 6, 1987

[87] PCT Pub. No.: WO87/04840
PCT Pub. Date: Aug. 13, 1987

[30] Foreign Application Priority Data

Feb. 7, 1986 [SU] U.S.S.R. .............................. 3134543
Feb. 7, 1986 [SU] U.S.S.R. .............................. 3134134

[51] Int. Cl.$^4$ .................... G11B 7/00; G01D 15/10; H04N 1/21
[52] U.S. Cl. .................................. 369/111; 369/100; 369/113; 369/114; 369/115; 369/121; 346/76 L; 346/125; 346/138; 358/296; 358/300
[58] Field of Search ............... 369/110, 111, 112, 113, 369/114, 115, 120, 121, 146, 179, 151, 100; 355/3 DD, 3 DR; 346/5, 6, 76 L, 138, 103, 125, 126, 127, 132, 138, 160; 358/296, 300, 301

[56] References Cited

U.S. PATENT DOCUMENTS

| 3,373,414 | 3/1968 | Carter ................. 346/138 X |
| 3,925,607 | 12/1975 | Hauber ............................. 346/138 X |
| 4,074,282 | 2/1978 | Balas, Jr. et al. ............ 346/76 L X |
| 4,233,612 | 11/1980 | Hirayama et al. ................... 346/160 |
| 4,297,713 | 10/1981 | Ichikawa et al. ............... 346/160 X |
| 4,351,005 | 9/1982 | Imai et al. ...................... 358/300 X |
| 4,528,580 | 7/1985 | Inoue et al. .......................... 346/160 |
| 4,564,850 | 1/1986 | Kazuharu ..................... 346/76 L X |
| 4,693,548 | 9/1987 | Tsunoi ............................ 346/160 X |
| 4,717,925 | 1/1988 | Shibata et al. .................. 346/160 X |

FOREIGN PATENT DOCUMENTS

| 0051339 | 5/1982 | European Pat. Off. ........ 369/111 X |
| 3203599 | 8/1982 | Fed. Rep. of Germany ... 369/111 X |
| 2222718 | 10/1981 | France ............................ 369/111 X |
| 1580398 | 12/1980 | United Kingdom ........... 369/100 X |

OTHER PUBLICATIONS

IEEE Spectrum, 1979, 11, N.2, pp. 33–38.

Primary Examiner—William L. Sikes
Assistant Examiner—Brian M. Healy
Attorney, Agent, or Firm—Lilling & Greenspan

[57] ABSTRACT

Disclosure is made of an optical storage device wherein a cylindrical information carrier (2) with a recording medium (12) applied on a tubular base (9) is disposed in a stationary cylindrical container (3) having a window (4) in the lateral wall thereof. A lens (5) is secured in the window (4) of the cylindrical container (3) to let through the radiation flux from a source (1) of modulated coherent radiation. The cylindrical container (3) is filled with a liquid or gaseous medium transparent for the radiation flux. The length of this cylindrical container (3) is at least twice as long as that of the recording coating (12) applied on the tubular base (9) of the cylindrical information carrier (2) equipped with drives for rotation and axial motion.

6 Claims, 4 Drawing Sheets

OPTICAL STORAGE DEVICE

TECHNICAL FIELD

This invention relates to information accumulating devices and, in particular, to optical storage devices.

BACKGROUND ART

Intelligence of computers is largely dependent on the sophistication of their external memory. At present, the overall speed of computers is lower by two or three orders than that of their computing units precisely because of inadequate external memories. Basic technical characteristics of external memories include information capacity, recording density, access time, information exchange speed, and storage reliability. Optical external memories possess certain advantages as contrasted to magnetic external memories, such as larger capacity, greater density and reliability and are therefore more promising.

Known in the art is an optical memory (IEEE Spectrum, 1979, 11, N.2, pp.33–38) comprising a source of modulated coherent radiation including a laser and a modulator and optically connected with a movable information carrier made as a sealed optical disk, a recording medium being coated on the internal surfaces of transparent walls of the disk, and an information addressing unit.

However this optical memory is deficient in that it is not very reliable and its recording density is not sufficiently high. It is not reliable because the optical disk is rather fragile and, also, because the working surfaces of the optical disk tend to deform by changes in the atmospheric pressure. Low recording density is due to variations in recording density for storage tracks having different radii. The resolution of the "dry" objective lens in the movable optical head is low which adds to this disadvantage, the numerical aperture of the lens cannot be larger than one.

The closest prior art, both technically and by the result obtained, is an optical memory (GB, A, No. 1 580 398) comprising optically connected elements: a source of modulated coherent radiation and a cylindrical information carrier equipped with a rotational drive. The cylindrical information carrier is a rigid nontransparent cylinder whose external surface is covered by a recording coating and which carries, by means of separating rings, an external relatively thin protective transparent cylinder. In the process of operation the external protective transparent cylinder rotates with the rigid nontransparent cylinder. The internal space of the cylindrical information carrier is communicated with the atmosphere in order to avoid deformation of the external protective cylinder by changes in the atmospheric pressure.

But this optical memory also has several disadvantages. Its recording density is low and it is not sufficiently reliable. Low recording density is due to the fact that the recording coating used to register information can be applied only on the external surface of the rigid nontransparent cylinder and, also, due to the use of a "dry" objective lens having a low numerical aperture. This optical memory is not reliable because the internal space of the cylindrical information carrier is not sealed off from the environment and, when the temperature conditions of the carrier change in the process of operation in relation to the temperature of the environment, this carrier "breathes" in or out. The internal space sucks in large amounts of dust, moisture, and other foreign bodies which are deposited on the surface of the recording coating, which substantially reduces reliability of information reading-recording. The reliability of this prior art memory device is also affected because the surface of the protective cylinder is often damaged in the process of its fast rotation.

This invention is to provide an optical storage device having such an arrangement as to increase the sharpness of focus of the radiation beam carrying information and, simultaneously, to make more dense recording more reliable.

This is achieved by that in an optical storage device comprising a source of modulated coherent radiation, which is optically connected to a cylindrical information carrier equipped with a drive for rotation, and provided with a recording coating applied on the substrate of the cylindrical information carrier, according to the invention, the cylindrical information carrier is disposed in a stationary cylindrical container having, in the side wall thereof, a window wherein a lens is placed to transmit modulated coherent radiation, said cylindrical container being filled with a liquid or gaseous medium for the radiation flux from the source of modulated coherent radiation and the length of said cylindrical container being at least twice as large as that of the recording coating applied on the substrate of the cylindrical information carrier equipped with a drive for axial motion.

Since the proposed optical memory makes use of a stationary lens, it permits much better adjustment of the optical system, the sharpness of focusing the flux of modulated coherent radiation on the surface of the recording coating of the cylindrical information carrier can be drastically improved. Since the cylindrical information carrier is arranged inside a stationary cylindrical container, it is well protected from damage and dirt, thus making information storage more reliable. The lens is placed in a window in the wall of the stationary cylindrical container and, during addressing, the cylindrical carrier has to be axially moved in relation to the stationary container. The length of the inner space of the cylindrical container should, therefore, be equal to or exceed the double length of the recording coating on the cylindrical information carrier.

Advisably, when the cylindrical container is being filled with a gaseous medium, the axial drive of the cylindrical information carrier should be the electric linear drive whose stationary part is disposed on the lateral wall of the cylindrical container, while the movable part thereof is placed on at least one butt face of the cylindrical movable information carrier.

It is also advisable that, when the cylindrical container is being filled with a liquid medium, the drive for axial motion of the cylindrical information carrier should be a reversible hydraulic drive whose piston is the cylindrical information carrier and whose cylinder is the cylindrical container, while the working fluid is the liquid medium which is desirably a low-viscosity immersion oil.

It is desirable that at least one impermeable radial partition should be placed in the internal space of the cylindrical information carrier.

It is also advisable that a protective coating should be applied on the recording coating provided on the base of the cylindrical information carrier.

Since the cylindrical information carrier of the proposed optical memory is disposed within a cylindrical container filled with immersion oil, the numerical aperture of the objective lens can be significantly increased and the sharpness of focusing of the radiation flux can, therefore, be substantially improved. The axial hydraulic drive becomes extremely convenient for addressing information. The cylindrical information carrier is provided with impermeable radial partitions in order to increase its hydraulic resistance and improve the efficiency of the hydraulic drive. The purpose of the protective coating is to prolong the service life of the recording coating on the cylindrical information carrier in the working fluid medium.

BRIEF DESCRIPTION OF ACCOMPANYING DRAWINGS

The invention will now be described in more detail with reference to specific embodiments thereof and accompanying drawings wherein.

BEST MODE FOR CARRYING OUT THE INVENTION

Figure 1:
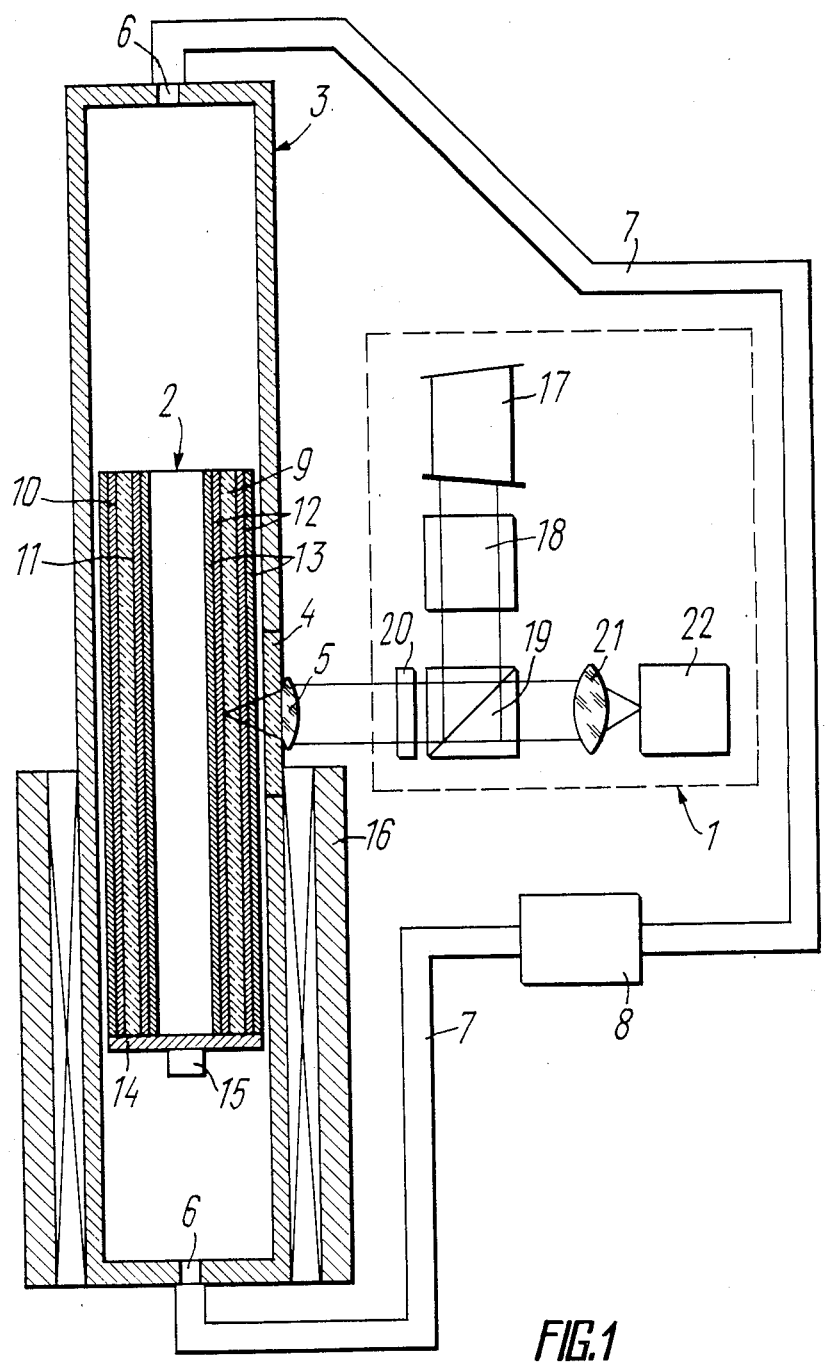
FIG. 1 shows a general section view of an optical memory according to the invention.

An optical memory comprises, according to the invention, a source 1 of modulated coherent radiation and, optically connected thereto, a cylindrical information carrier proposed in a stationary cylindrical container 3 made of a nontransparent material, such as metal, alloys, plastic. A window 4 is provided in the lateral surface of the container 3 and a lens 5 is secured therein to let through the radiation flux from the source 1 of modulated coherent radiation. The inner space of the cylindrical container 3 is filled with a gaseous medium, e.g. air. Butt faces of the cylindrical container 3 are provided with openings 6 to which is connected a pipeline 7 equipped with a bidirectional pump 8 of the pneumatic drive which is, in this embodiment, the drive for axial motion of the cylindrical information carrier 2, while the cylindrical information carrier 2 performs as a piston of this pneumatic drive. The cylinder of this pneumatic drive is the cylindrical container 3.

The cylindrical information carrier 2 comprises a tubular base 9 transparent for the radiation flux of the source 1 of modulated coherent radiation. A recording coating 12 is applied on the external and internal surfaces 10 and 11 of the tubular base 9. It is possible that the recording layer 12 may be applied to only one surface 10 or 11 of the tubular base 9. A protective coating 13 is also applied over the recording coating 12. The recording coating 12 on the tubular base 9 may, for example, be a chalcogenide layer, while the protective coating 13 may be made from metallic oxides, e.g. ferric oxide $Fe_2O_3$.

A radial impermeable partition 14 is secured on one of the butt faces of the tubular base 9. A rotor 15 of the motor for rotating the cylindrical information carrier 2 is installed on this radial partition 14, while a stator 16 of this motor is installed on the lateral surface of the cylindrical container 3. The length of the cylindrical container 3 is at least twice as long as the length of the recording coating 12 applied on the tubular base 9.

The source 1 of modulated coherent radiation comprises a laser 17, an optical modulator 18, and a polarization divider 19, all optically connected. One output of the polarization divider 19 is optically coupled, via a quarter wave plate 20, with the lens 5, while the other output of the polarization divider 19 is optically coupled, via a lens 21, with a photoreceiver 22.

The optical memory claimed in this description operates as follows. Reference tracks and service information are recorded on the cylindrical information carrier 2 prior to placing it into the cylindrical container 3. Then the pipe-line 7 of the pneumatic drive for axial motion of the cylindrical information carrier 2 is connected to openings 6 in the butt faces of the stationary cylindrical container 3. The optical memory is ready for operation. When operating, the cylindrical information carrier 2 is rotated by the motor to a specific speed, the source 1 of modulated coherent radiation emits a low-power unmodulated radiation flux which corresponds to readout process. The radiation flux is reflected from the cylindrical information carrier 2 and is modulated by service information recorded in the information track under the lens 5. The reflected radiation flux passes the quarter wave plate 20 twice, in the direct and reverse directions. The polarization plane of the flux is changed by 90°, the radiation flux is admitted to the polarization divider and, further on, to the photoreceiver 22 where the optical signal is converted into an electrical signal to be supplied to a control unit (not shown in the drawings for simplicity). The control unit processes the read out service information and extracts information on the number of the track hit by the radiation flux. This information is compared with the number of the information track corresponding to a given address and the control unit instructs the pneumatic drive for axial motion of the cylindrical carrier 2 to switch over to a specific information track. Since the lens 5 is secured stationary on the cylindrical container 3, addressing process in the claimed optical memory is performed by axial motions of the cylindrical information carrier 2 in relation to the cylindrical container 3. It is for this reason that the inner space of the cylindrical container 3 should be twice as long or even longer than the recording coating 12 on the cylindrical information carrier 2. If necessary, an instruction can be produced to re-focus the radiation flux from the recording coating 12 on the external surface 10 of the tubular base 9 to the recording coating 12 applied on the internal surface 11 or vise versa. When the control unit determines that the desired track is hit by the radiation flux, it starts processing the readout service information to separate data on the number of sector under the lens 5. After the control unit is satisfied that the desired address is found, the readout process is started to obtain the required information or recording of information fed from the control unit. To record, the signal to be recorded is supplied to the optical modulator 18 and the intensity or some other quality of the radiation flux of the laser 17 is modulated. Since in this optical memory lens 5 through which the radiation flux hits the recording coating 12 is stationary on the fixed cylindrical container 3, the optical system can be very finely adjusted and focus becomes much more sharp as compared to prior art devices.

Besides, the cylindrical container 3 protects the cylindrical information carrier 2 from dirt and damage. The cylindrical information carrier 2 is still more protected because the pneumatic system is sealed off. This makes the recording and readout processes in the proposed optical memory extremely reliable.

In another embodiment of the invention, a cylindrical information carrier 23 (FIG. 2) is sealed by installing two impermeable radial partitions 24 and 25 in the butt ends of the tubular base 9.

In this embodiment, the recording coating 12 is applied only on the internal surface 11 transparent for the radiation flux emitted by the source 1 of modulated coherent radiation. A moving part 26 of an electrical drive for linear motion is secured on the partition 24, while a stationary part 27 thereof is secured on the lateral surface of the cylindrical container 3. The electric drive for linear motion is at the same time the drive for axial motion of the cylindrical information carrier 23. A rotor 28 of the electric motor is secured on the partition 25, while a stator 29 of the motor is secured on the lateral surface of the cylindrical container 3 and envelops the rotor 28. The motor is rotational drive of the cylindrical information carrier 23. Butt faces of the cylindrical container 3 are provided with opening 6, as in the former embodiment of the optical memory, but in this case they are intended as air inlets and outlets during axial motions of the cylindrical information carrier 23. In all other respects the optical memory of FIG. 2 is similar to that of FIG. 1.

Figure 2:
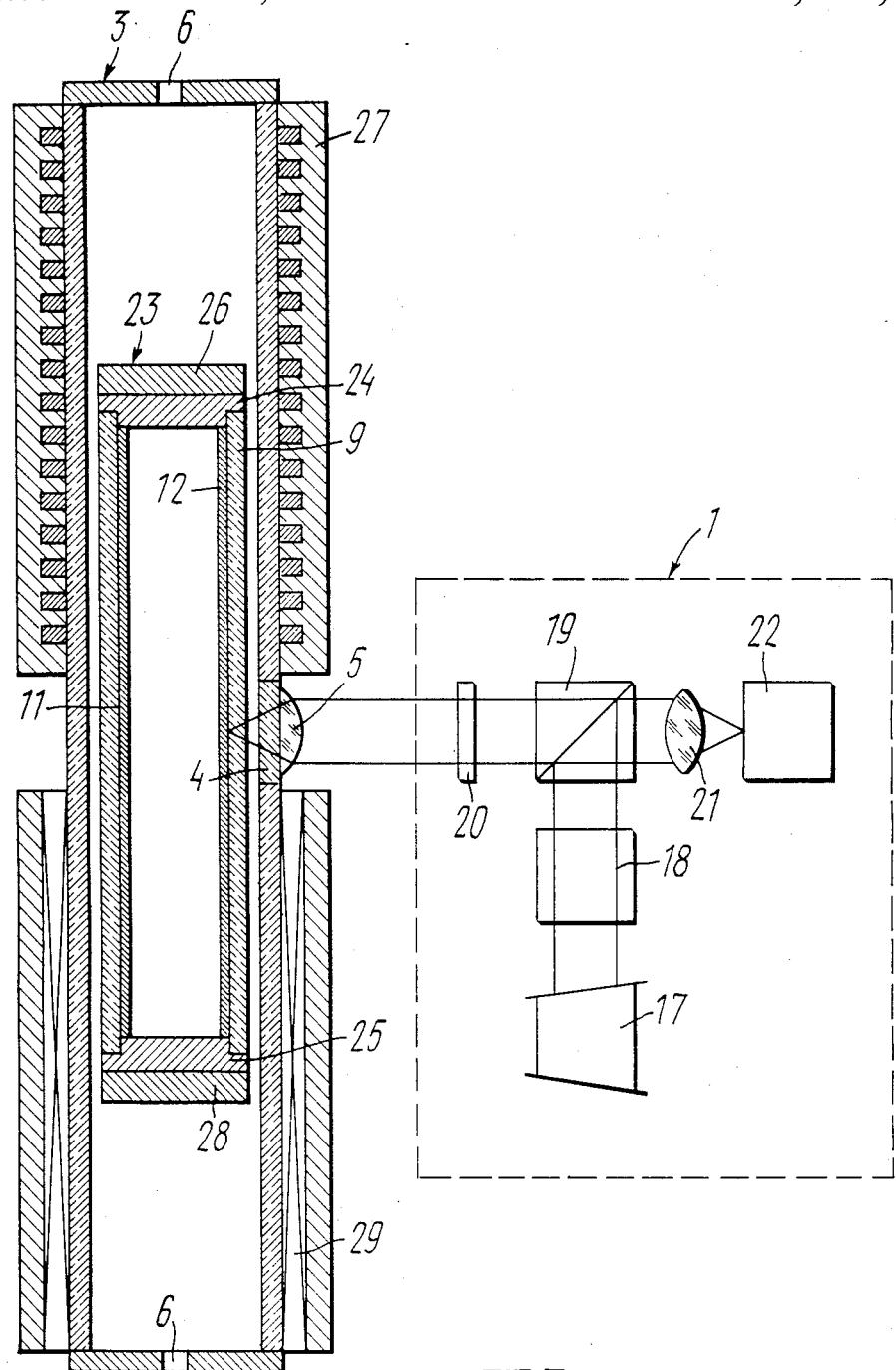
FIG. 2 shows a view of an optical memory equipped with a drive for axial motion of the cylindrical information carrier, which is made as an electric linear drive, according to the invention.

The operation of the optical memory of FIG. 2 is somewhat different. Since the recording coating 12 is available only on the internal surface 11 of the transparent tubular base 9, no commands are required to switch over to the other recording coating. In all other respects the optical memory of FIG. 2 is analogous to that of FIG. 1.

Figure 3:
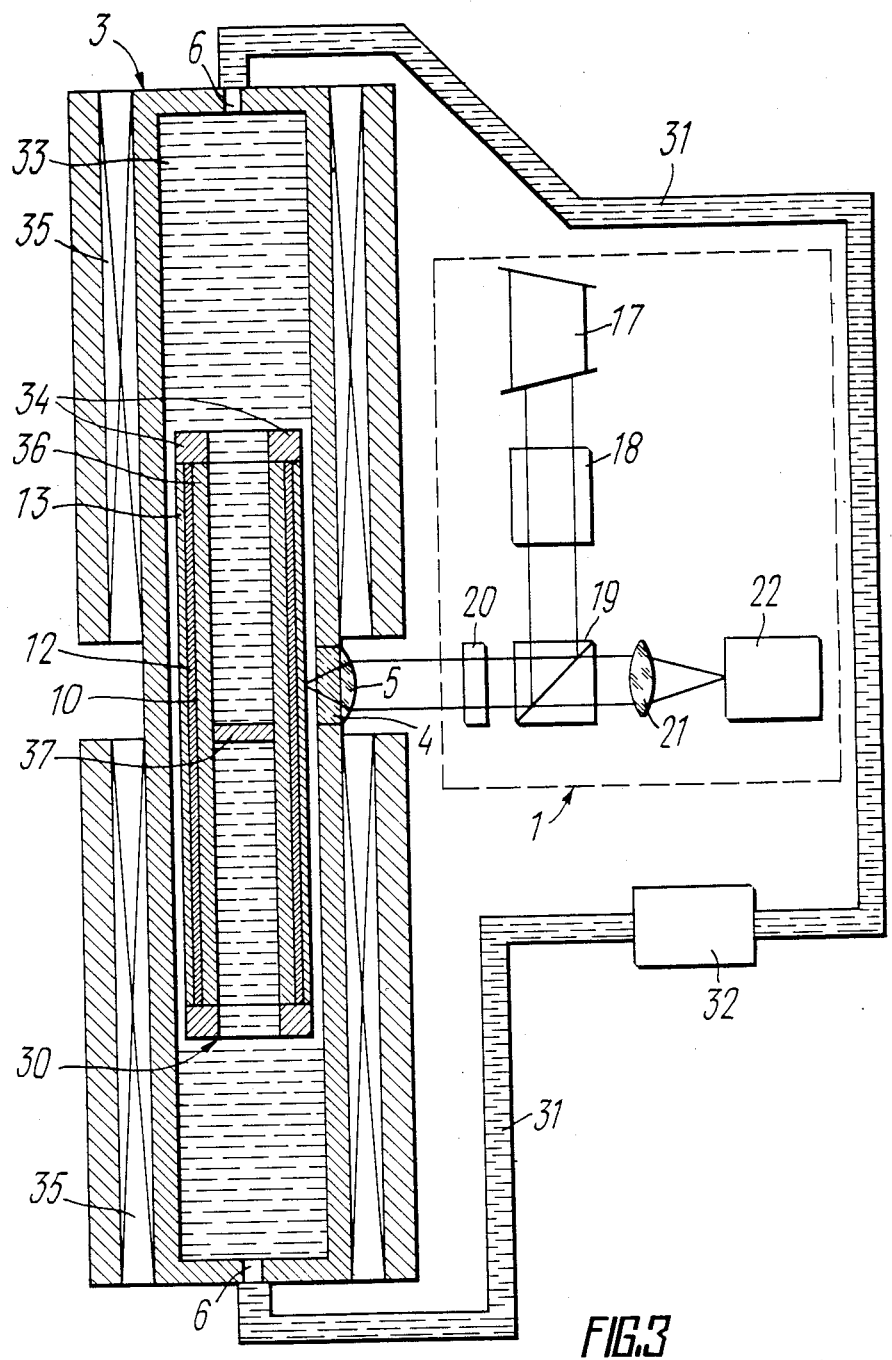
FIG. 3 shows a view of an optical memory wherein the cylindrical container is filled with a liquid medium and the drive for axial motion of the cylindrical information carrier provided with one impermeable radial partition is a bidirectional hydraulic drive, according to the invention.

In still another embodiment of an optical memory according to the invention there is provided a bidirectional hydraulic drive for axial motion of a cylindrical information carrier 30 (FIG. 3). In this case, a pipeline 31 is connected to the cylindrical container 3 via the openings 6 available in the butt faces thereof. The pipeline 31 is connected to a bidirectional hydraulic pump 32 of the bidirectional hydraulic drive. The cylindrical container 3 is filled with a fluid, e.g. low-viscosity immersion oil 33, and has a lens 5 secured on the lateral surface thereof. The cylindrical information carrier 30 is arranged within the cylindrical container 3. Rotors 34 of the motor for rotating the cylindrical information carrier 30 are installed on the butt ends thereof, while stators 35 of the motor are installed on the lateral surface of the cylindrical container 3, each stator 35 enveloping its rotor 34.

A recording coating 12 and a protective coating 13 are applied on the external surface 10 of a tubular base 36, which is non-transparent for the radiation flux emitted by the source 1 of modulated coherent radiation. An impermeable radial partition 37 is installed in the inner space of the tubular base 36. The cylindrical container 3, like in the other embodiments, is at least twice as long as the recording coating 12 on the tubular base 36. The source 1 of modulated coherent radiation is similar to that of the optical memory of FIG. 1. In this embodiment, the immersion oil 33 is the working fluid of the bidirectional hydraulic drive for axial motion of the cylindrical information carrier 30, where the function of the piston is performed by the cylindrical information carrier 30 and the function of the cylinder by the container 3.

The optical memory according to the invention operates as follows.

During recording, a radiation flux, in the visible or near infrared range, is modulated and projected by the lens 5 on the recording coating 12 of the sealed cylindrical information carrier 30. This modulated flux records information in the desired address. The addressing process is performed by rotating the cylindrical information carrier 30 about its axis inside the stationary cylindrical container 3 and, also, by its axial motions effected by the bidirectional hydraulic drive for axial movements.

During readout, a radiation flux is not modulated and weakened by the optical modulator 18. The lens 5 projects this radiation flux on the cylindrical information carrier 30 whose movements are effected like during recording. The reflected radiation flux is modulated by the signal recorded on the cylindrical information carrier 30 and is supplied to the photoreceiver 22 where it is converted into an electrical reproduction signal.

The immersion oil 33 of low viscosity, which is filling the cylindrical container 3 wherein the cylindrical information carrier 30 is placed, permits a higher numerical aperture of the lens 5. The radiation flux is more sharply focused on the recording coating 12, thus increasing the information recording density.

Since in this embodiment the cylindrical information carrier 30 rotates in a low-viscosity fluid medium 33 which can be compressed much less than air, radial wobbling of the carrier cylinder during rotation is significantly reduced. This adds to a more sharp fo us of the radiation flux.

In one more embodiment of the invention, the optical memory can be equipped with a bidirectional hydraulic drive wherein a cylindrical information carrier 38 (FIG. 4) is provided with two impermeable radial partitions 39 installed in the butt ends of a transparent tubular base 40, the recording coating 12 being applied onto the internal surface 11 thereof.

Figure 4:
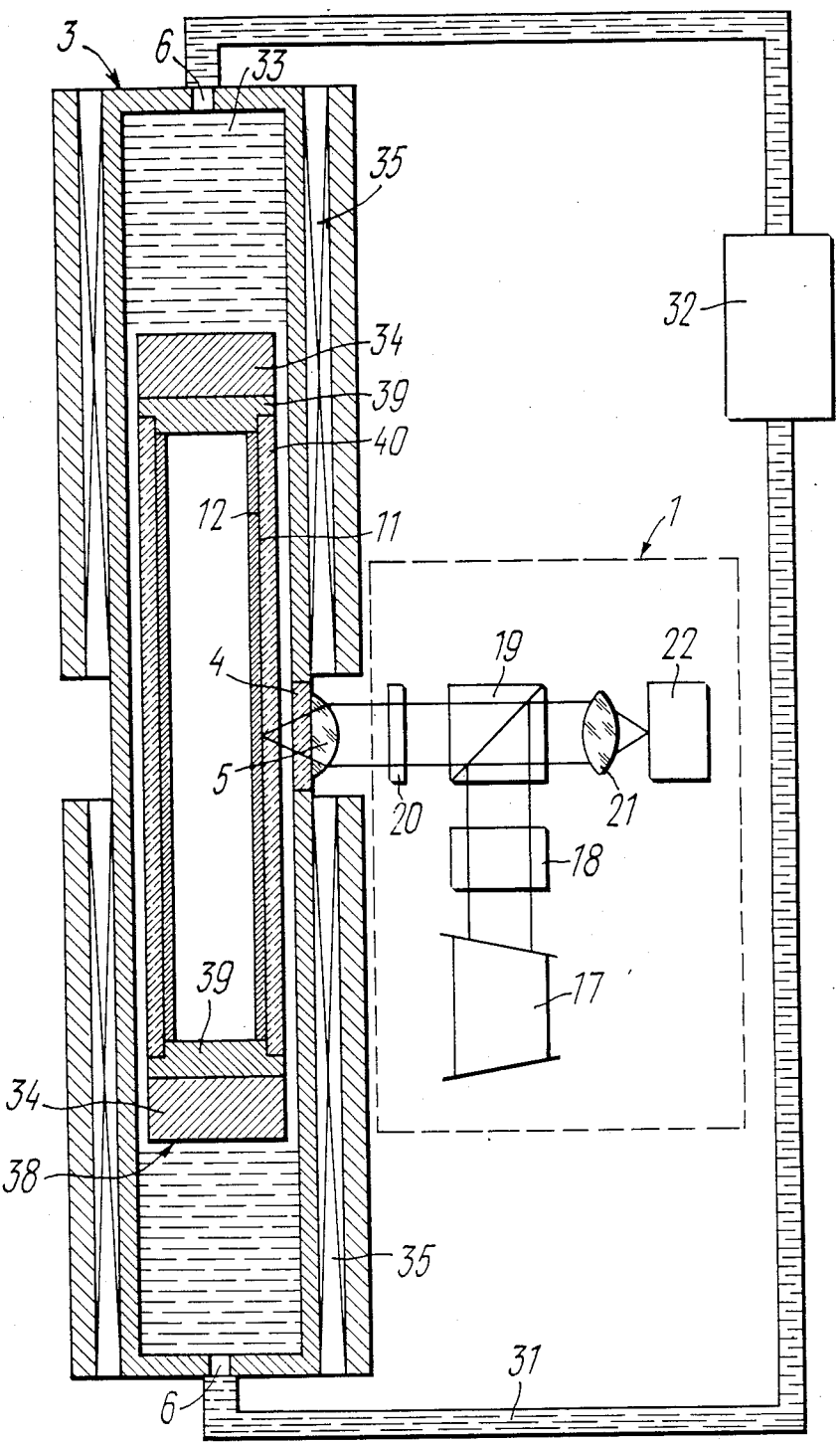
FIG. 4 shows the view of FIG. 3 wherein the cylindrical information carrier is fitted with two impermeable radial partitions, according to the invention.

In all other respects the design of the optical memory as shown in FIG. 4 is analogous to that of FIG. 3. In this embodiment the reliability of recording is still more improved because the recording coating 12 is not exposed to the immersion fluid 33. Moreover, a dirt layer which may occur on the external surface 10 of the tubular transparent base 40 is outside the focus of the lens 5 and has no practical effect on the operation of the optical memory according to the invention.

To summarize, an optical memory described herein above and its embodiments can ensure more sharp focus of the information-carrying radiation flux and a substantial respective rise in the recording density. In addition it makes recording more reliable.

Industrial Applicability

The present invention can be used in computers, video and sound recording devices, information storage and processing systems, in particular, in external memories for computers.

We claim:

1. An optical storage device comprising a source (1) of modulated coherent radiation, which is optically connected with a cylindrical information carrier (2, 23, 30, 38) equipped with a rotational drive and a recording coating applied on a tubular base (9, 36) of the cylindrical carrier (2, 23, 30, 38), characterized in that the cylindrical carrier (2, 23, 30, 38) is disposed in a stationary cylindrical container (3) provided window (4) in the lateral wall thereof and a lens (5) secured in said window (4) to let through the radiation flux from the source (1) of modulated coherent radiation, the inner space of the cylindrical container (3) being filled with a liquid or gaseous medium transparent for the radiation flux and permits movement of said cylindrical carrier within said cylindrical container, the length of the stationary cylindrical container (3) being twice as long as that of the recording coating (12) applied on the tubular base (9, 36) of the cylindrical information carrier (2, 23, 30, 38) equipped with a drive for axial motion.

2. An optical storage device as claimed in claim 1, characterized in that, in order to fill the stationary cylindrical container (3) with a gaseous medium, the drive for axial motion of the cylindrical information carrier (23) is an electrical linear drive having a stationary part (27) disposed on the lateral surface of the stationary cylindrical container (3), while a movable part (26) thereof is disposed on at least one of the butt ends of the cylindrical information carrier (23).

3. An optical storage device as claimed in claim 1, characterized in that, in order to fill the stationary cylindrical container (3) with a liquid medium, the drive for axial motion of said cylindrical information carrier (30, 38) is a bidirectional hydraulic drive having as its piston the cylindrical information carrier (30, 38), as its cylinder the stationary cylindrical container (3), and as its working fluid the liquid medium.

4. An optical storage device as claimed in claim 3, characterized in that the liquid medium is a low-viscosity immersion fluid (33).

5. An optical storage device as claimed in claim 3, characterized in that at least one impermeable radial partition (14, 24, 25, 37) is installed in the internal space of the cylindrical information carrier (2, 23, 30, 38).

6. An optical storage device as claimed in claim 5, characterized in that a protective coating (13) is applied on the recording coating (12) on the tubular base (9, 40) of the cylindrical information carrier (2, 23, 30, 36).

* * * * *